June 17, 1958        M. AUSTER        2,839,201
TRAY FOR GAS TANK CAP
Filed Dec. 2, 1954
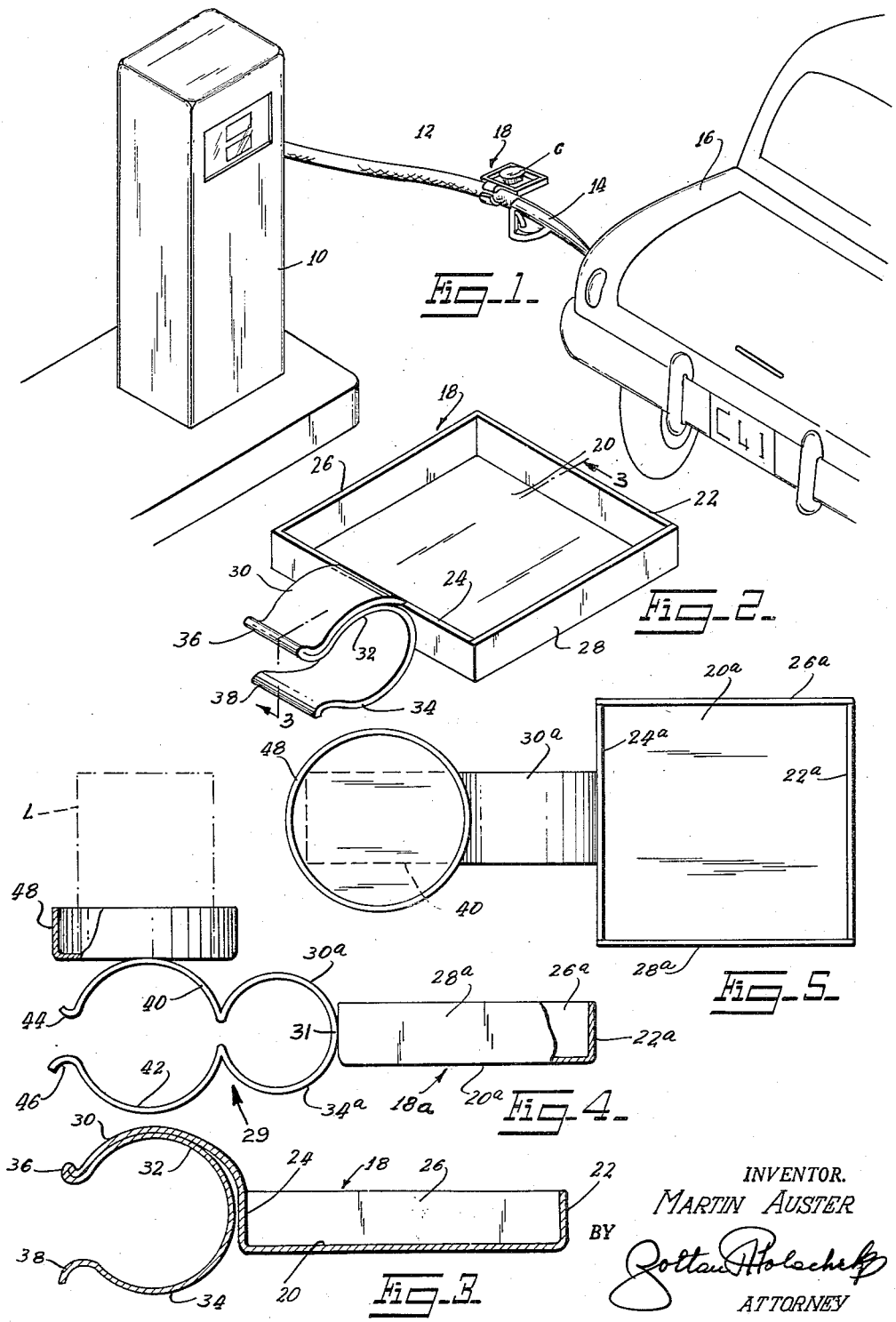
INVENTOR.
MARTIN AUSTER

United States Patent Office 2,839,201
Patented June 17, 1958

2,839,201

TRAY FOR GAS TANK CAP

Martin Auster, East Rockaway, N. Y.

Application December 2, 1954, Serial No. 472,594

2 Claims. (Cl. 211—86)

This invention relates to a tray attachment for the hose of a service station gas pump, which is adapted to be supported by said hose adjacent the nozzle thereof, and which serves as a repository for the cap of the tank of an automobile, while said tank is being filled with gasoline from the pump.

It is a not uncommon occurrence for a service station attendant to forget to replace the cap, after removing the delivery nozzle from the gas tank of an automobile, and often, the customer drives away without knowing that the cap has not been returned to its proper position. This is particularly apt to occur during busy times in a service station, or when the customer is served by an inexperienced or inefficient attendant.

In view of the above, the main object of the present invention is to provide a tray attachment for the delivery hoses of service station gas pumps, which attachment will be conveniently disposed for placement of the cap therein while the gasoline is being pumped into the automobile gas tank. The attachment, according to the invention, is permanently located within view of the attendant and, accordingly, the tendency of the attendant to forget to replace the cap is measurably reduced or completely eliminated.

Another object of importance is to so mount the tray attachment upon the hose as to cause the cap to fall out of the attachment should an attempt be made to hang the nozzle upon the rack provided therefor on the pump without first removing the cap from the tray. In this way, by reason of the cap's falling to the ground, the failure of the attendant to replace the cap is communicated both to the attendant and to the customer.

Another object of importance is to provide a device of the type stated which will be attachable to a hose or nozzle without requiring modification or redesign of the hose or nozzle of a gasoline pump in any way.

Still another object is to so design the tray attachment that the gasoline tank cap may be placed on a nearby tray, when the tank is being filled, and to make it unnecessary to place the cap on the fender and thus to avoid scratching of the finish of the automobile.

Yet another object, in a second form of the invention, is to so design the attachment as to permit it to be connected to hoses of different diameters.

A further object, in the second form, is to design a clamp which is carried by the tray and which not only is adapted to receive hoses of different diameters, but also serves as a support for a small container, such as a can of lubricant designed to be poured directly into the tank. In this way, the service station attendant, should the customer call for lubricant of the type stated, can place the container in the provided receptacle, thus to insure that the attendant will not forget to pour the lubricant into the gas tank after the tank has been filled with gasoline.

For further comprehension of the invention and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a fragmentary perspective view showing an automobile and service station pump, and illustrating an attachment embodying one form of the invention secured to the hose through which gasoline is being delivered to the tank of the vehicle.

Fig. 2 is an enlarged perspective view of the attachment per se.

Fig. 3 is an enlarged sectional view on line 3—3 of Fig. 2.

Fig. 4 is a side elevational view, partly broken away, of a modified form, a can of lubricant being illustrated in dotted outline in supported position.

Fig. 5 is a top plan view of the form shown in Fig. 4.

In Fig. 1, the reference numeral 10 has been applied to a conventional service station gasoline pump, from which extends a flexible hose 12 carrying a nozzle 14 through which gasoline is delivered into the tank of the automobile 16. The tray attachment, constituting the present invention, has been designated generally at 18, and in the form of Figs. 1–3 can be formed from a single blank of sheet metal material shaped to include a flat, rectangular tray bottom 20 formed with low upstanding walls on its several sides, the marginal portion of the blank being bent upwardly to provide said walls. Said walls include an outer wall 22, an inner wall 24, and side walls 26, 28, respectively.

Integrally formed upon the midlength portion of the inner wall 24, at the top edge of said wall 24, is a clamp means, which can be bent out of an elongated, wide tongue provided upon the blank. The tongue is bent to include an arcuate upper clamp section formed of folded, contacting portions 30, 32, the portion 30 at its inner end being merged into the material of the wall 24. The portion 32, at its inner end, merges into a bottom clamp section 34 also of arcuate formation, and thus there is defined a split clamp of springable characteristics adapted to grip the hose 12 adjacent the nozzle 14. The outer ends of the sections are bent outwardly as at 36, 38 respectively to provide lips that will facilitate the attachment of the clamp to the hose without danger of scratching or cutting the hose.

In use, the clamp arms or sections are spread apart against the spring tension thereof to receive the hose 12, and when fully applied to the hose tightly grip the same to prevent rotation of the clamp means about the hose. The tray is thus supported laterally of the hose, in a substantially horizontal plane when the hose is positioned to extend the nozzle 14 into the automobile gas tank, and the cap C of the vehicle gas tank can be placed in the tray while the tank is being filled.

When the nozzle 14 is removed, the attendant can remove the cap C to replace it on the neck of the gas tank. The location of the tray is such as to reduce considerably the possibility of the attendant's overlooking or forgetting to remove the cap before the nozzle is hung upon the pump 10 awaiting its next use. Should, however, the attendant fail to remove the cap at the time the gasoline delivery is completed, the cap will fall out of the tray to the ground at the time the nozzle is being hung, and this will make an audible sound so as to remind the attendant to place the cap back on the vehicle gas tank.

In Figs. 4 and 5 there is shown a modified construction designated generally at 18ᵃ, adapted for mounting on hoses of different diameters and also adapted to serve as a support for a can of lubricant L, such as a small can containing lubricant of the type that is deposited directly in the vehicle engine to improve operation of the engine. In the modified form the tray per se is similar to that shown in the first form of the invention, includes a flat tray bottom 20ª having upstanding walls 22ª, 24ª, 26ª, 28ª, respectively. In this form of the invention the clamp indicated generally at 29 is not an integral part of the blank of material used in forming the tray and instead is welded to the outer surface of the wall 24ª. The clamp includes arcuate clamp arms 30ª, 34ª formed from a single piece of material, a bight portion 31 being provided at the inner ends of said clamp arms, with said bight portion being welded to the wall 24ª. At their outer ends, the arms 34ª, 30ª are spaced apart to facilitate insertion of the hose, and merge into arcuate outer clamp arms 40, 42 the free extremities of which are bent outwardly to provide curved lips 44, 46. The arms 40, 42 are struck upon a common radius, as are the arms 30ª, 34ª, but the radius of the arms 30ª, 34ª is smaller than the radius about which the arms 40, 42 are curved.

The clamp arm 40, immediately between its ends, supports an upwardly facing, cup-shaped, cylindrical receptacle 48, the flat bottom of said receptacle being welded at its center to the midlength part of arm 40ª with the receptacle bottom lying in a horizontal plane parallel to the plane of the bottom 20ª of the tray. A can of lubricant L can be placed in the receptacle 48, while the gasoline tank is being filled, and in this way, the attendant is visually reminded that the customer has ordered said lubricant.

Should the gasoline hose be of greater diameter than the normal hose shown in Fig. 1, the clamp arms 40, 42 will be engaged thereabout, rather than the arms 30ª, 34ª. Of course, when the device is being mounted upon a small diameter hose, said hose can move fully through the space between the arms 40, 42, so as to be springably engaged between the inner clamp arms 30ª, 34ª.

It is to be understood that the tray and clamp may be made of any suitable substance such as metal, plastic material, etc. and that the size, shape and proportion of the tray may also be changed as desired.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A tray attachment for the delivery hose of a service station gasoline pump comprising a substantially square-shaped tray member adapted to receive a vehicle gasoline tank cap, and hose-engaging clamp means on said tray member, said tray member including a flat bottom and low walls extending upwardly from the periphery of the bottom, the clamp means being secured to one of said walls and extending laterally therefrom, the clamp means being formed from a single length of springable material shaped to include, midway between its ends, a bight portion fixedly connected to the tray member, said length of material at opposite ends of the bight portion being shaped to include oppositely bowed, inner clamp arms, the length of material at its ends being formed with oppositely bowed outer clamp arms integrally connected at their inner ends to the outer extremities of the inner clamp arms, the outer clamp arms being struck on a common radius greater in length than the radius about which the inner clamp arms are struck, said attachment further including means carried by one of the outer clamp arms adapted to support a container of lubricant or the like.

2. A tray attachment for the delivery hose of a service station gasoline pump comprising a substantially square-shaped tray member adapted to receive a vehicle gasoline tank cap, and hose-engaging clamp means on said tray member, said tray member including a flat bottom and low walls extending upwardly from the periphery of the bottom, the clamp means being secured to one of said walls and extending laterally therefrom, the clamp means being formed from a single length of springable material shaped to include, midway between its ends, a bight portion fixedly connected to the tray member, said length of material at opposite ends of the bight portion being shaped to include oppositely bowed, inner clamp arms, the length of material at its ends being formed with oppositely bowed outer clamp arms integrally connected at their inner ends to the outer extremities of the inner clamp arms, the outer clamp arms being struck on a common radius greater in length than the radius about which the inner clamp arms are struck, outwardly flaring lips on the free ends of said outer clamp arms, said attachment further including means carried by one of the outer clamp arms adapted to support a container of lubricant or the like, said last-named means being in the form of an upwardly opening receptacle, said receptacle being cylindrically shaped with a flat bottom fixedly secured at the center thereof to the receptacle-supporting clamp arm.

References Cited in the file of this patent

UNITED STATES PATENTS

| | | |
|---|---|---|
| 795,181 | Williams | July 18, 1905 |
| 1,208,533 | Folger | Dec. 12, 1916 |
| 1,557,546 | Allen | Oct. 20, 1925 |
| 1,747,710 | Hanley | Feb. 18, 1930 |
| 2,090,176 | Besanson | Aug. 17, 1937 |
| 2,166,533 | Oettel | July 18, 1939 |
| 2,475,274 | Beckwith | July 5, 1949 |
| 2,559,464 | Roberg | July 3, 1951 |
| 2,564,476 | Fregan | Aug. 14, 1951 |
| 2,592,186 | Ratliff | Apr. 8, 1952 |
| 2,620,082 | Harmon | Dec. 2, 1952 |
| 2,702,683 | Green | Feb. 22, 1955 |